P. MUELLER.
ADJUSTABLE ESCUTCHEON.
APPLICATION FILED NOV. 12, 1919.

1,377,597.

Patented May 10, 1921.
2 SHEETS—SHEET 1.

Inventor
Philip Mueller,

Witness

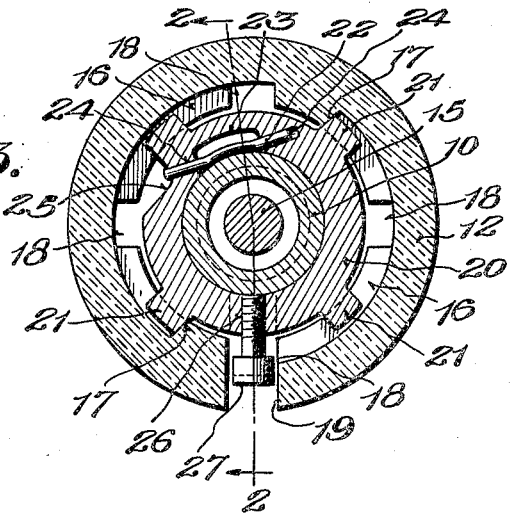
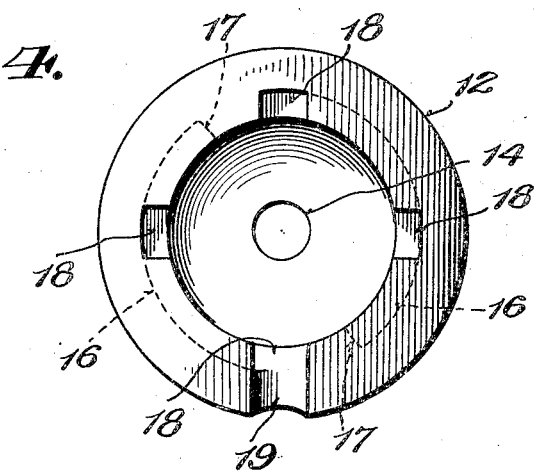
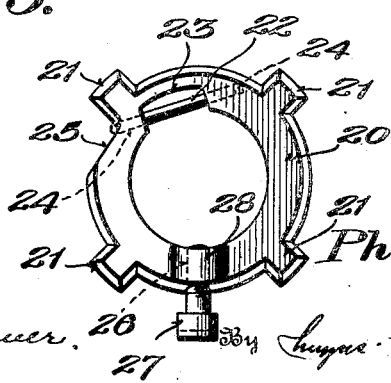

UNITED STATES PATENT OFFICE.

PHILIP MUELLER, OF DECATUR, ILLINOIS, ASSIGNOR TO ADOLPH MUELLER, TRUSTEE, OF DECATUR, ILLINOIS.

ADJUSTABLE ESCUTCHEON.

1,377,597.      Specification of Letters Patent.      Patented May 10, 1921.

Application filed November 12, 1919. Serial No. 337,488.

*To all whom it may concern:*

Be it known that I, PHILIP MUELLER, a citizen of the United States, residing at Decatur, in the county of Macon and State of Illinois, have invented new and useful Improvements in Adjustable Escutcheons, of which the following is a specification.

This invention relates to wall or slab fittings for pipes, such as the shanks of cocks or faucets, and has particular reference to means for securing a flange or escutcheon in adjusted position upon the shank of a cock or other pipe-like member.

It is the purpose of the present invention to provide means for securing the escutcheon or flange in adjusted position upon a pipe or cock shank, without scratching, breaking or otherwise marring the escutcheon, and this is of particular advantage when securing an escutcheon or flange of vitreous material in place. It is now customary to secure vitreous escutcheons and flanges in place by means of a flanged nut, or the like, which is threaded onto the cock shank and against the outer or smaller end of the escutcheon, and the escutcheon being of comparatively fragile material, and the smaller end being the weakest part of the escutcheon, it is not infrequently broken. Furthermore, in this old type of securing means for escutcheons, special fittings were required to provide threaded connections for the clamping nut.

In accordance with the present invention practically no strain is exerted upon the escutcheon when the securing means therefor is locked in adjusted position upon a cock shank or the like and the base or larger end of the escutcheon, which end is obviously the stronger part, receives the securing means so that there is little danger of breaking the escutcheon when attaching it to a pipe-like member.

A further advantage of the present structure is that there are no threads between the shank or pipe and the retaining or securing means, so that the escutcheon may be attached to the ordinary cock without employing special fittings.

The securing means is very simple in construction, may be cheaply made, and it, together with the escutcheon, may be readily assembled and adjusted in place upon a pipe or cock shank. The escutcheon is readily detachable from the retaining means so that the escutcheon may be changed without removing the retaining means from the cock shank, and in this operation it is only necessary to remove a screw from the retaining member, which may be quickly and readily done.

In the accompanying drawings I have shown my improved securing means employed for fastening an escutcheon to a cock of the "partition" type, but it is to be understood that this disclosure is by way of illustration only, and is not restrictive of my invention since the escutcheon securing means may be used on the shanks of various types of cocks, or on pipes generally.

In said drawings,

Fig. 3 is a transverse sectional view taken on the line 3—3 of Fig. 2;

Fig. 4 is a plan view of the base or larger end of the escutcheon; and

Fig. 5 is a bottom plan view of the escutcheon securing means.

Figure 1:
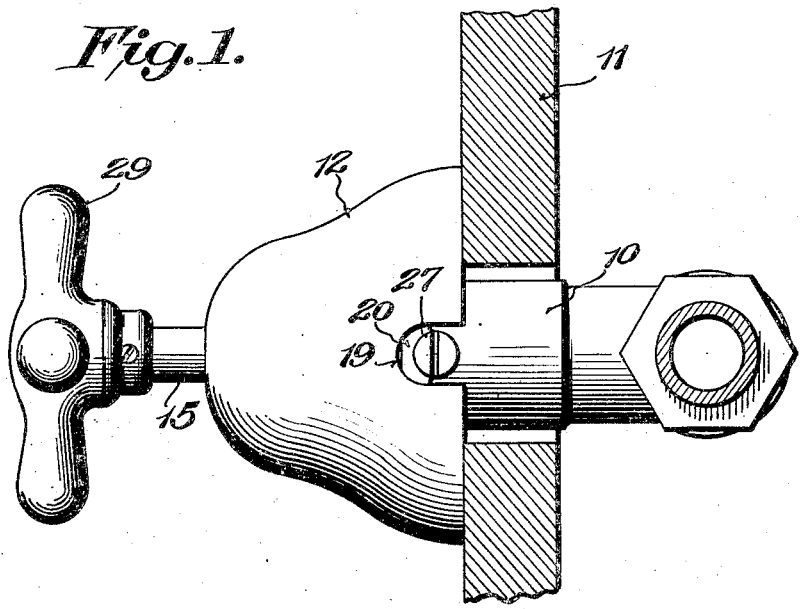
Figure 1 is an elevational view of the escutcheon applied to a "partition" stop-cock, the wall or slab through which the shank of the cock passes being shown in cross section.
Figure 2:
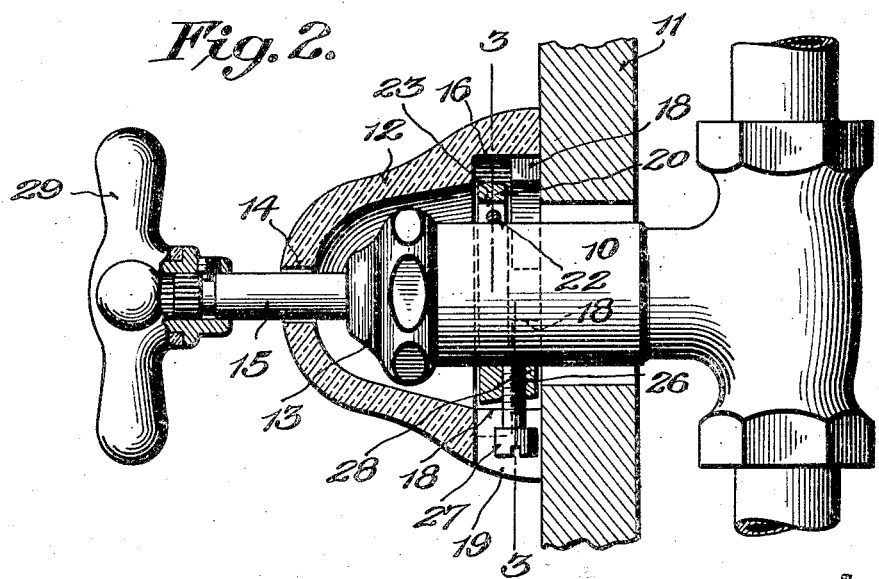
Fig. 2 is a longitudinal sectional view through the assembly shown in Fig. 1, and is taken on the line 2—2 of Fig. 3.

Referring to the drawings, wherein like reference characters represent like parts in the several views, the numeral 10 designates a shank of the cock, which may be of any suitable type or construction, and this shank extends through an opening or aperture in the wall or slab 11.

In the present instance the escutcheon, designated by the numeral 12, is somewhat dome shaped and houses the shank 10 and the cap 13 of the stop-cock, and it has, at its smaller end, an axial opening 14 which receives the stem 15 of the cock. Adjacent the edge of the base of the escutcheon is an internal annular groove 16, which is interrupted by a pair of diametrically disposed stops or abutments 17. Leading from the annular groove 16 to the end of the escutcheon are grooves or channels 18, which are preferably equally spaced, in the present instance four such channels being shown. One of these channels 18, forms a part of a slot 19, which extends on a radial line through the wall of the escutcheon. Each channel 18, together with its associated section of the groove 16, forms, in effect, a bayonet slot. No claim is made in the present application to this type of escutcheon, *per se*, my application filed March 22, 1921, Serial No. 454,401, being directed to this feature of the development.

My improved securing means for fastening the escutcheon in adjusted position, comprises a retaining member which is in the form of a ring 20, having radially extending lugs 21, which lugs are equal in number and similarly spaced to the notches 18 of the escutcheon, so as to be received thereby. While I have shown four notches 18 and a corresponding number of lugs 21, it is to be understood that the number of notches and lugs may be varied as desired. For the purpose of maintaining the retaining member 20 against rotation relative to the shank 10, when the escutcheon is being attached to, or detached from, the retaining member, the retaining member carries a shank-engaging friction means comprising a resilient pin 22. The pin 22 is made of spring material, and is so located as to form a chord of a small arc on the through opening of the retaining member. Preferably the retaining member at the central portion of the pin is internally notched, as at 23, so as to permit the pin to flex. The opposite ends of the pin 22 are located within a drilled hole 24, and to facilitate the drilling of this hole the ring 20 is externally notched as at 25.

For the purpose of positively securing the retaining escutcheon member against longitudinal movement upon the shank of the cock, and to lock the escutcheon against rotary movement relative to the retaining member 20, the ring 20 is provided with a threaded radial aperture or opening 26 which receives a set screw 27. The aperture 26 is preferably located within a boss 28 depending from the under surface of the ring 20 and situated midway between adjacent lugs 21 so that when these lugs are within the groove 16 and against abutments 17 thereof, the slot 19 of the escutcheon is in registry with this aperture 26 and the insertion of the set screw 27 in the slot 19 and aperture 26 may be effected. By locating the boss 28 on the under side of the ring 20, the slot 19 may be of relatively small depth and therefore the slot is not readily noticeable.

The manner of assembling the parts upon a pipe or faucet shank, will be readily understood from the foregoing description. The retaining member or ring 20 is slipped onto the shank 10 before the stuffing nut 13 is threaded onto the shank, and this may, if desired, be performed at the factory, the handle 29 of the cock being left off the stem 15 until after the cock is set up and the escutcheon applied. When the retaining member is in place on the shank 10, the pin 22 engages at its center the shank, and the pin being flexed outwardly into the notch 23, it presses against the shank with sufficient force to hold the ring against movement while the escutcheon is being attached to the ring 20. After the cock has been fitted in place, the escutcheon is brought into position where it houses the shank 10 with the stem 15 extending through the opening 14 of the escutcheon and the handle 29 is then attached to the stem 15. The screw 27 is removed from the opening 26 and the channels 18 are brought into registry with the lugs 21 of the retaining member and the escutcheon is moved forwardly until the lugs 21 are in alinement with the groove 16, when the escutcheon is rotated until the lugs engage the stops 17, and during this operation, rotation of the retaining member 20 is prevented, due to the frictional engagement between the pin 22 and the shank 10. The escutcheon, together with the retaining member, may then be moved longitudinally and without rotation upon the shank until the base of the escutcheon engages the surface of the wall 11, the natural spring of the pipe to which the fixture is coupled serving to maintain the parts in snug engagement with the wall. The screw 27 is now threaded into the opening 26 of the retaining member until the inner end of the screw bears against the shank.

It will be noted from the foregoing description that to apply my means to the shank of a faucet or cock or the like, it is not necessary to provide the cock with special means, such as screw threads or the like, for receiving the escutcheon retaining member. The retaining member may be mounted upon the usual shank of the cock and may be readily adjusted thereon by merely moving the retaining member or ring 20 longitudinally. The retaining member is positively locked against accidental movement upon the shank of the cock and the escutcheon is locked against rotary movement relative to the retaining member by means of a single member which, in the present instance, comprises the said screw 27.

What I claim is:

1. In a wall fitting, a shank; and an escutcheon retaining member having an opening for receiving said shank and also having a resilient pin forming a chord of a small arc of the opening thereof, said pin between its ends being in frictional engagement with said shank.

2. In a wall fitting, a shank; an escutcheon retaining means comprising a ring having an internal notch and a pin extending across said notch and forming a chord of a small arc of the opening through the ring, said pin between its ends being in frictional engagement with said shank.

3. In a wall fitting, a shank; an escutcheon retaining member having an opening for receiving said shank and a resilient pin forming a chord of an arc of the opening thereof, said pin between its ends being in frictional engagement with the shank; and means carried by the retaining member for positively locking the same in adjusted position upon the shank.

4. In a wall fitting, a shank; an escutcheon retaining ring upon the shank and having outstanding lugs; an escutcheon having a slot and also having adjacent its open end an interrupted annular groove and channels extending from said groove to the end of the escutcheon to permit insertion of the lugs in the groove; and a set screw within said slot and carried by said retaining member for positively locking the retaining member against movement upon the shank.

5. In a wall fitting, a shank; an escutcheon, having at its open end bayonet slots or L shaped grooves; a retaining member carried by said shank and having lugs adapted to be received by said bayonet slots; and a single means for positively locking said retaining member to the shank and preventing rotation between the escutcheon and the retaining member.

6. In a wall fitting, a shank; an escutcheon having at its open end internal L shaped grooves; a retaining member about the shank and having outstanding lugs adapted to be received by said grooves of the escutcheon; and a resilient pin carried by the retaining member and forming a chord of a small arc of the opening thereof and frictionally engaging said shank to prevent rotation of the retaining member when the escutcheon is rotated relative thereto.

7. In a wall fitting, a shank; an escutcheon; a retaining member on the shank adapted to receive the escutcheon; means carried by the retaining member and engaging the shank to frictionally maintain said member against rotation; and means for positively locking the retaining member against movement upon the shank.

8. In a wall fitting, a shank; a retaining member on the shank; an escutcheon housing the retaining member; interlocking means on the escutcheon and retaining member for preventing rectilinear movement therebetween, said interlocking means being brought into engagement upon relative rotation of the member and escutcheon; frictional means carried by the retaining member and engaging the shank to prevent rotation of the retaining member when the escutcheon is rotated relative thereto; and means for positively locking said retaining member to the shank and said escutcheon against rotation.

9. In a wall fitting, a shank; an escutcheon; a retaining member on the shank adapted to receive the escutcheon; a pin carried by the retaining member and forming a chord of an arc in the opening thereof and frictionally engaging said shank; and means for positively locking the retaining member against movement upon the shank.

10. In a wall fitting, a shank; a retaining member on the shank; an escutcheon housing the retaining member; interlocking means on the escutcheon and retaining member for preventing rectilinear movement therebetween, said interlocking means being brought into engagement upon relative rotation between the member and escutcheon; frictional means carried by the retaining member and engaging the shank to prevent rotation of the retaining member when the escutcheon is rotated; and a set screw carried by the retaining member and engaging the shank to lock the retaining member against movement.

11. In a wall fitting, a shank; an escutcheon; a retaining member on the shank adapted to receive the escutcheon, a resilient pin carried by the retaining member and frictionally engaging the shank; and a set screw carried by the retaining member for positively locking the retaining member against movement relative to the shank.

12. In a wall fitting, a shank, an escutcheon having at its open end internal L shaped grooves and a slot; a retaining ring on the shank having outstanding lugs adapted to be received by said grooves of the escutcheon; means carried by the retaining member and engaging the shank to frictionally maintain said member against rotation when the escutcheon is rotated; and a set screw carried by the retaining member and engaging in said slot to positively prevent rotation of the escutcheon and movement of the retaining member.

In testimony whereof I have hereto set my hand.

PHILIP MUELLER.